United States Patent [19]
Craven

[11] Patent Number: 5,415,378
[45] Date of Patent: May 16, 1995

[54] VALVE ASSEMBLY

[75] Inventor: John Craven, Roundhay, England

[73] Assignee: Cooper Industries, Inc., Houston, Tex.

[21] Appl. No.: 230,935

[22] Filed: Apr. 21, 1994

[30] Foreign Application Priority Data

May 11, 1993 [EP] European Pat. Off. ............ 93303626

[51] Int. Cl.⁶ .............................................. F16K 3/00
[52] U.S. Cl. ...................................... 251/329; 251/31
[58] Field of Search ............... 137/454.2, 375; 251/31, 251/329

[56] References Cited
U.S. PATENT DOCUMENTS 4,010,928  3/1977  Smith ...................................... 251/31
4,572,298  2/1986  Weston ............................. 251/329 X Primary Examiner—John C. Fox
Attorney, Agent, or Firm—Charles E. Neff; Eddie E. Scott

[57] ABSTRACT

A valve assembly comprising a tubular member (2) having an axial bore (4) which is selectively opened and closed by a gate valve. The gate valve includes a sliding gate (5), a first actuating stem (9,27) engagable with one side of the gate and a second actuating stem on the opposite side of the gate and also engagable with the gate. The actuating stems can move the gate between open and closed positions, and an intermediate position in which the gate can be run into and withdrawn from a support with the tubular member.

9 Claims, 6 Drawing Sheets

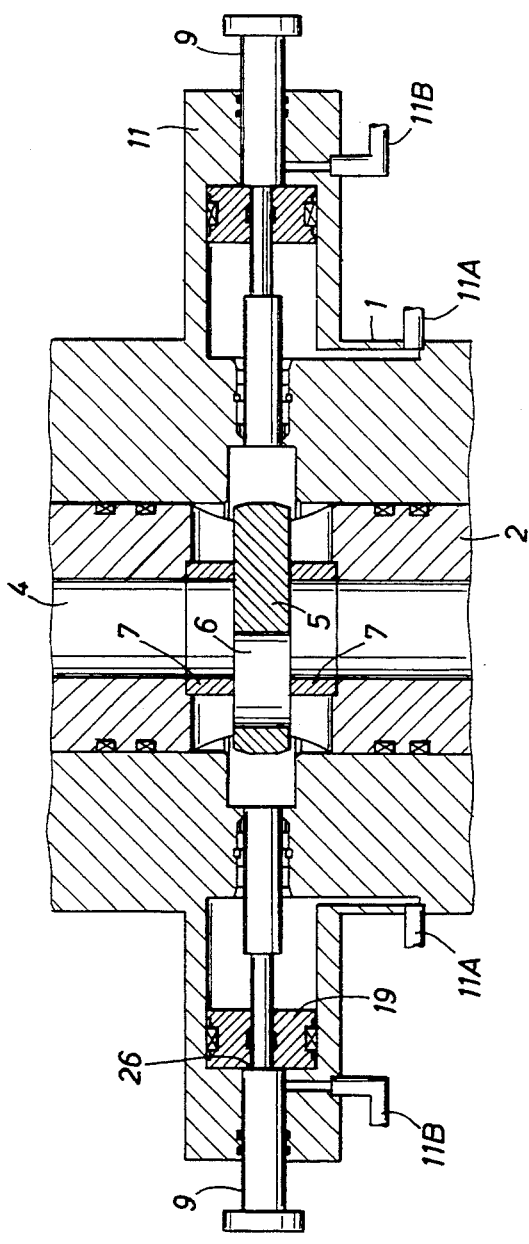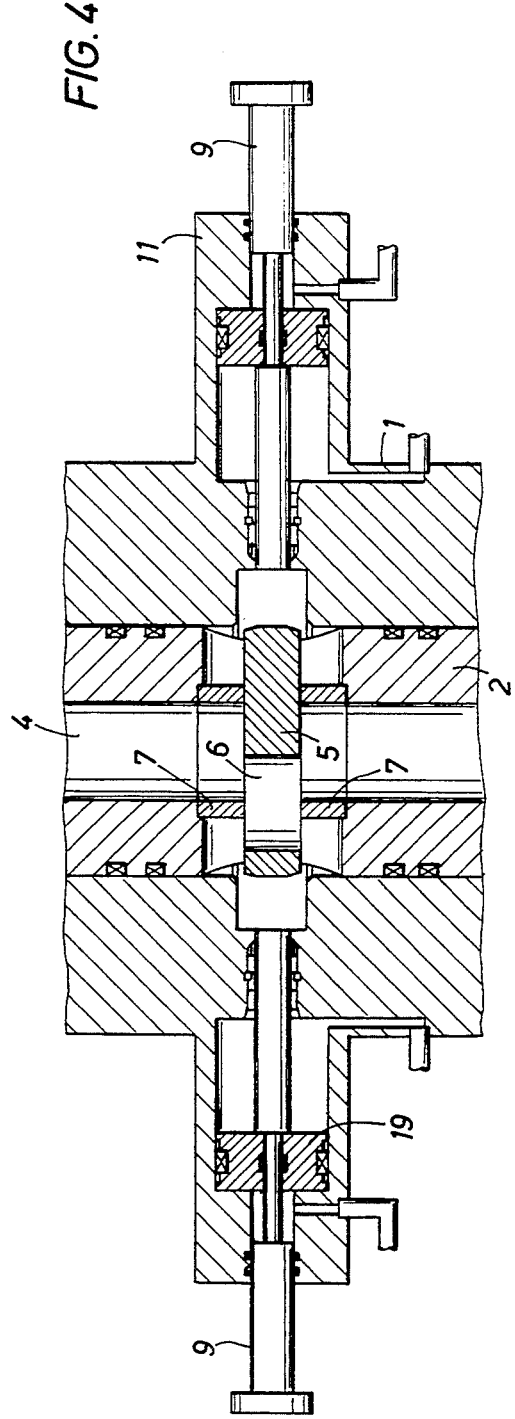

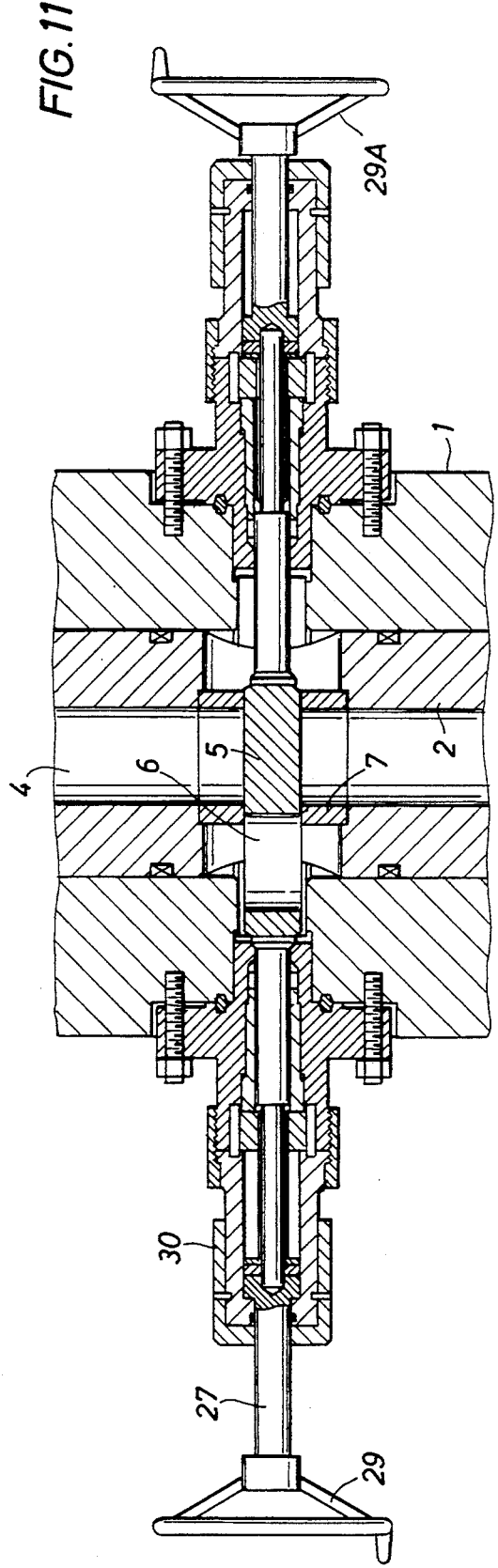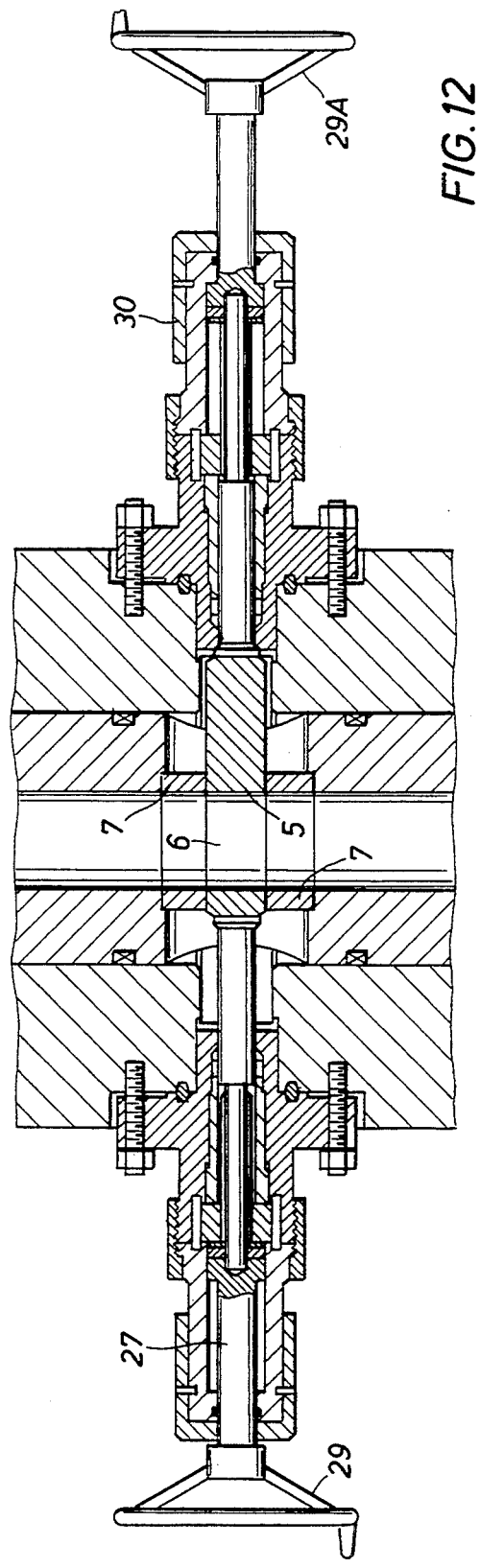

VALVE ASSEMBLY

The present invention relates to a valve assembly which can be used in a wellhead assembly.

In a wellhead assembly, it is usual to fill the bore of a tubing hanger with a wireline plug to isolate the upper part of the bore from a production region. The use of such plugs, of which there may be more than one in a wellhead, increases the number of wireline operations as each one has to be run in and set by a wireline. Further, once the plug is set, it requires a further wireline operation in order to remove it.

It is therefore an object of the present invention to provide means for sealing a bore which may be used in a wellhead assembly without requiring extra wireline operations.

According to the present invention, there is provided a valve assembly comprising a tubular member which seats, in use, in a support and has an axial bore which is selectively opened and closed by a gate valve, the valve comprising a gate having an opening therethrough, a first actuating stem engagable with one side of the gate and reciprocable, in use, through the support, and a second actuating stem, in use, engageable with the opposite side of the gate and reciprocable through the support, wherein the actuating stems can move the gate between open and closed positions, and an intermediate position in which the gate can be run into and withdrawn from the support with the tubular member.

The tubular member may be a tubing hanger or an isolation cap. The support is preferably provided by a spool body.

The gate can be run into a wellhead with the tubing hanger or isolation cap and makes the automatic control of the opening and closing of the bore possible, for example by hydraulic actuation. This therefore reduces the number of wireline operations necessary.

It is desirable that the gate be retainable in the intermediate position so that the tubular member can be withdrawn from the support without the gate interfering with the support. The gate is preferably retained by means of a detent which may comprise a spring loaded plunger in one of the tubular member and gate, the end of the plunger being engagable with a recess in the other of the tubular member and gate.

In order to ensure that the actuating stems do not interfere with the tubular member when it is removed from the support, it is preferable that actuating stems are retractable from engagement with the gate when it is in the intermediate position.

So that the position of the gate can be easily determined, it is preferable that the actuating stems project, in use, from the support to provide a visual indication of the position of the gate.

One way of realising hydraulic actuation which also allows the actuating stems to be retracted from engagement with the gate is by each actuating stem having an inner part, adjacent to the gate, a central part of smaller diameter than the inner part, and an outer part, remote from the gate, of larger diameter than the inner part, and a piston being sealed to and slidably fitted on the central part such that it is retained on the central part and abuts, in use, against the inner and outer parts at respective ends of the central part, the piston being sealed to and slidably received in a cylinder, which is fixed, in use, to the support, whereby the application of pressure to the cylinder of one of the actuating stems on the side of the piston remote from the gate causes the gate to be moved to its open position, the application of pressure to the cylinder of the other of the actuating stems on the side of the piston remote from the gate causes the gate to be moved to its closed position, the application of pressure to both cylinders on the side of the piston closest to the gate causes the gate be moved to its intermediate position, and the application of equal pressure to each side of both pistons causes the actuating stems to be retracted from the gate when it is in the intermediate position.

If the actuating stems are to be actuated manually, a handwheel is provided on each actuating stem at the end of the stem remote from the gate and each actuating stem is threadably engaged within a housing, whereby each handwheel can be rotated to move a respective stem axially.

Preferably an end cap which provides a stop for the handwheel is fitted over the end of each housing. This cap can preferably be selectively deployed in two axial positions relative to the axis of the actuating stem. This provides a simple way of stopping the actuating stems in their desired positions.

To ensure a good seal, between the gate and the tubular member, it is preferable that a seal ring is provided on each side of the gate which ring seal on one side against the gate and on the other side around the bore of the tubular member.

Preferably the seals between the gate and seal rings, and between the tubular member and seal rings are metal-to-metal seals.

Two examples of valve assemblies constructed in accordance with the present invention incorporated in wellheads will now be described with reference to the accompanying drawings in which:

FIG. 3 and 4 are axial sections similar to those of FIGS. 1 and 2 showing the gate in the intermediate position and additionally showing pressure supply lines;

FIGS. 11 and 12 show views similar to FIG. 9 with the gates in different positions.

The wellhead comprises a spool body 1 into which a tubing hanger 2 has been run and to which it is sealed by seals 3. The tubing hanger has a bore 4 which is opened and closed by a gate valve. As an alternative to the tubing hanger 2, the gate valve can be incorporated in an isolation cap which seats on a tubing hanger. In this case, the construction and operation of the valve assembly are similar to those described below with reference to the gate valve incorporated in the tubing hanger 2.

Figure 6:
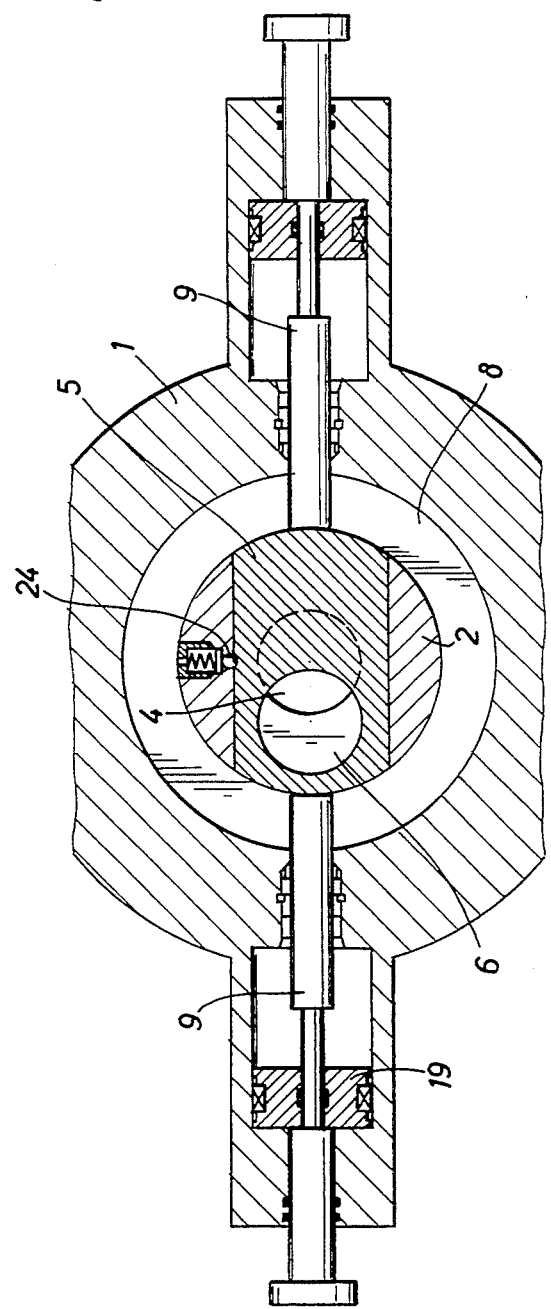
FIG. 6 is a section of the first example through the gate and wellhead perpendicular to the axis of the wellhead.
Figure 7:
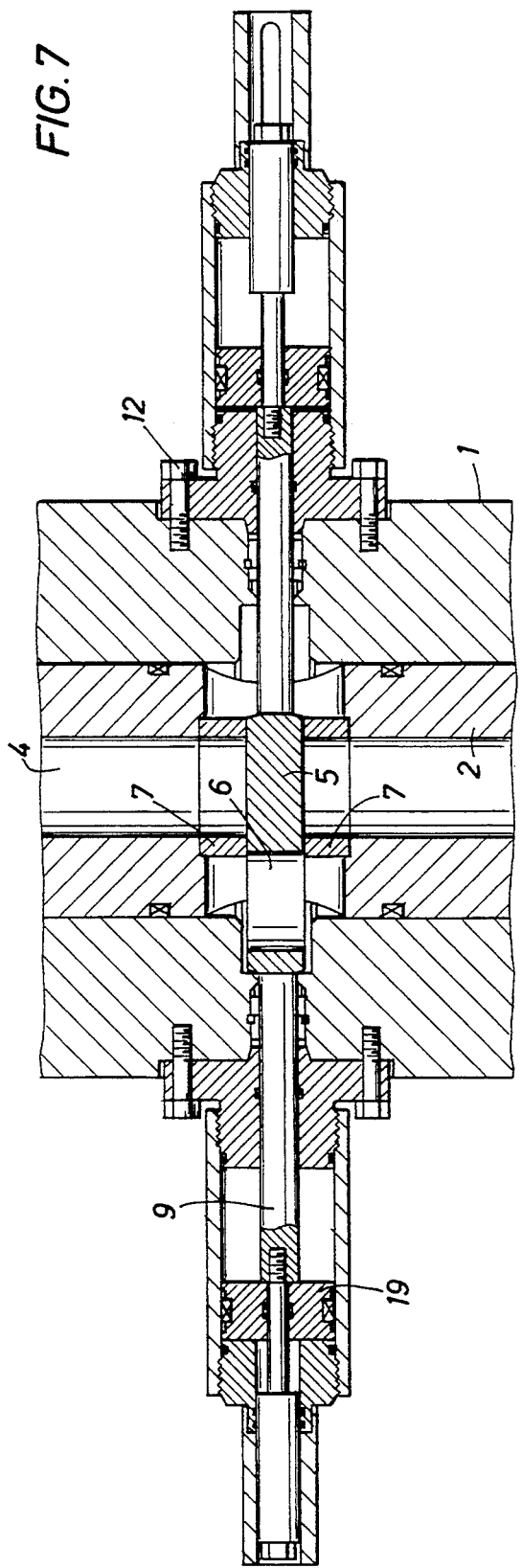
FIG. 7 is a diagrammatic section similar to the view show in FIG. 1.
Figure 8:
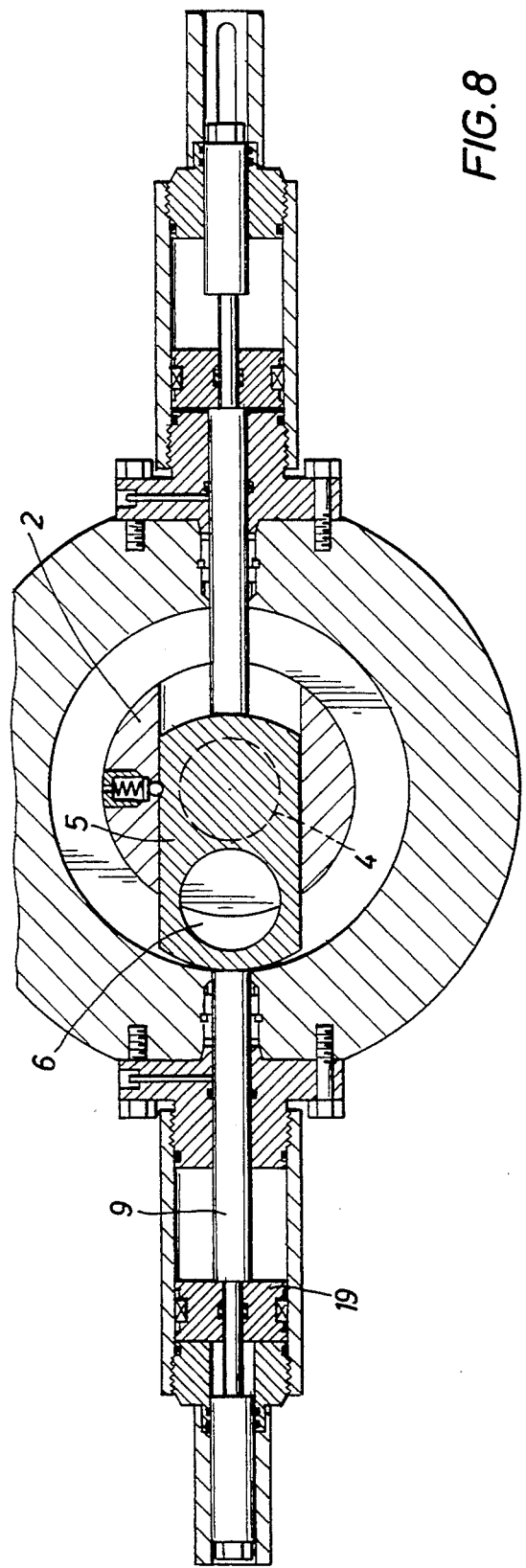
FIG. 8 is a diagrammatic section similar to FIG. 6 with the gate in the closed position.
Figure 9:
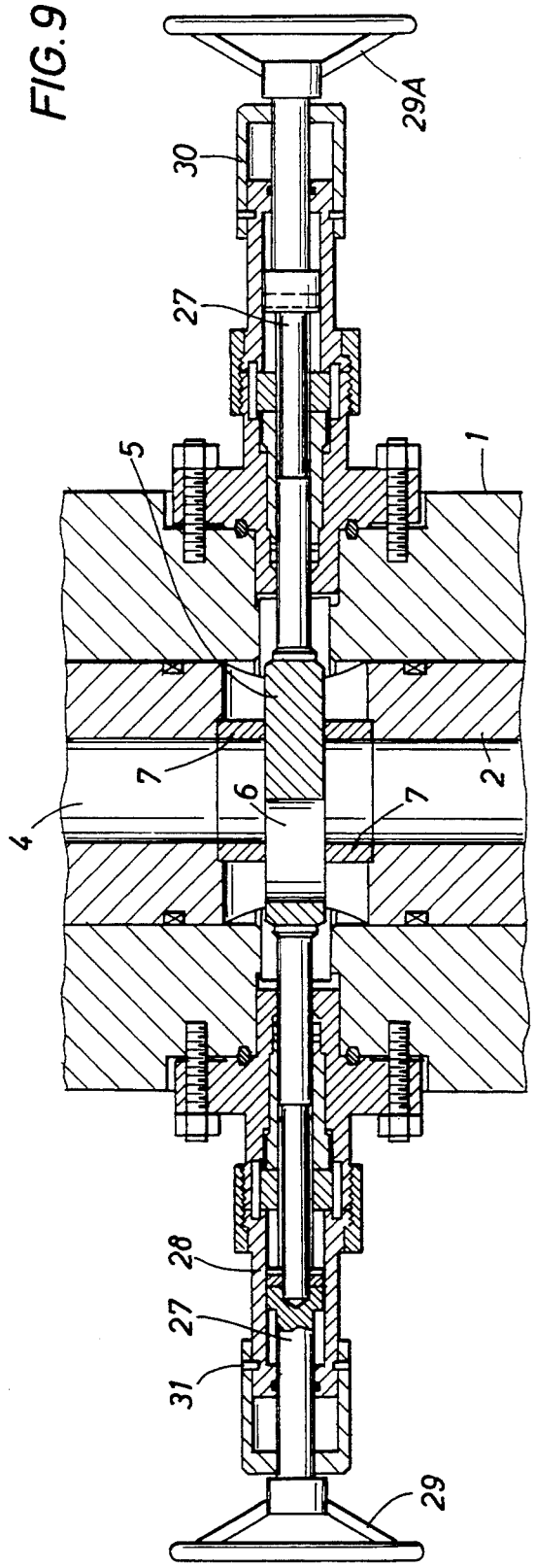
FIG. 9 is an axial section of the second example of a gate in the wellhead.
Figure 10:
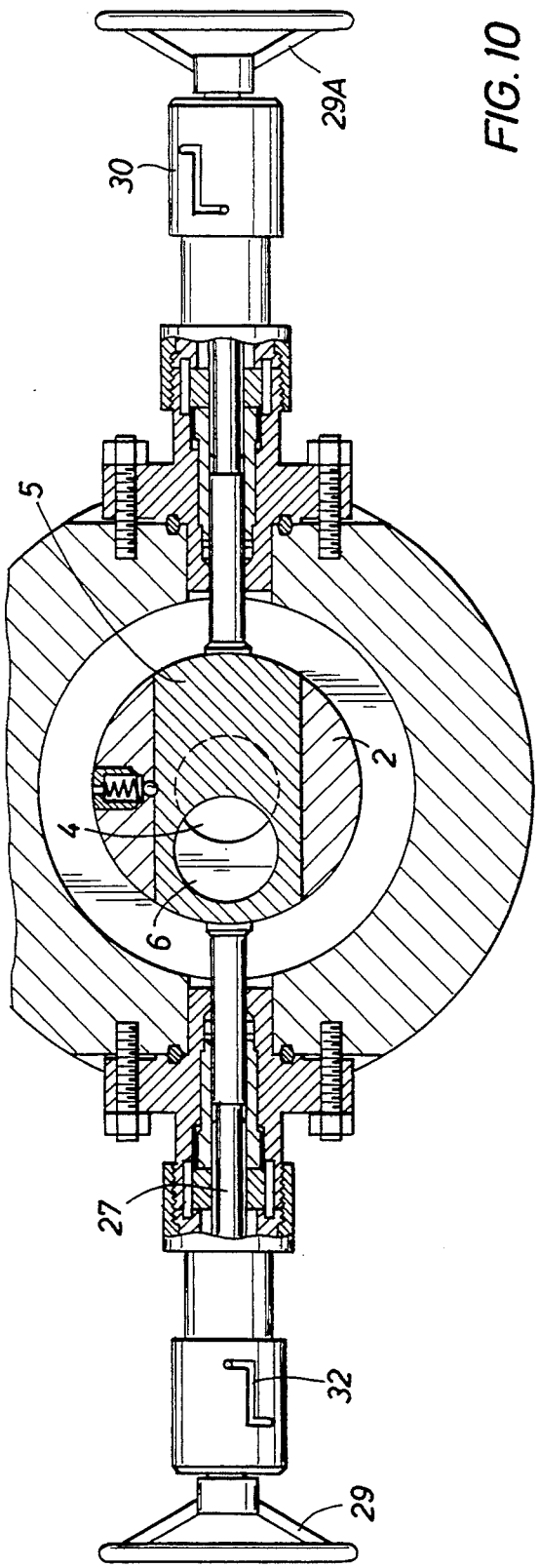
FIG. 10 is a section through the gate and wellhead perpendicular to the axis of the wellhead.

The gate valve comprises a sliding gate 5 which has a through hole 6 on one side, as best seen in FIG. 6. The gate valve is seated between two seat rings 7 which provide a metal-to-metal seal against the gate and also around the bore 4 of the tubing hanger 2. The gate is accommodated in a cavity in the tubing hanger 2 in a plane perpendicular to the bore of the hanger and the spool body 1 is provided with an annular recess 8 which accommodates the gate 5 in the open and closed positions, as shown in FIGS. 1 and 2.

Two actuating stems 9 are provided, on opposite sides of the gate 5. These extend through the recess 8, respective opposed bores 10 in the wall of the spool body 1, and into respective cylinders 11 which are bolted to the wall of the spool body by bolts 12. Each stem 9 projects through the end of the respective cylinder 11 and is provided with an end stop 13 which abuts against the cylinder 11 when the stem in its innermost position. The stem 9 is sealed to the cylinder 11 by annular seal members 14 and to the spool body by a stem packing 15. Each stem 9 has an inner part 16 adjacent to the gate, a central part 17 of smaller diameter than the inner part and an outer part 18, remote from gate, of larger diameter than the inner part. A piston 19 is slidable on the middle part 17 and is sealed thereto by a seal 20. The piston is also slidable within the cylinder 11 and a seal 21 is provided between the outer periphery of the piston 19 and the inner wall of the cylinder 11. A first pressure supply line 11A is provided in each cylinder 11 on the side closest to the gate 5 and a second pressure supply line 11B is provided in each case on the side of the cylinder remote from the gate (see FIGS. 3 and 4).

A detent mechanism 22 is housed in the side of the tubing hanger 2 and has a spring 23 which urges a plunger 24 into contact with the gate. The gate has a corresponding recess 24'into which the plunger 24 is urged when the gate 5 is in the intermediate position, as shown in FIG. 6, in order to retain the gate in this position.

Figure 1:
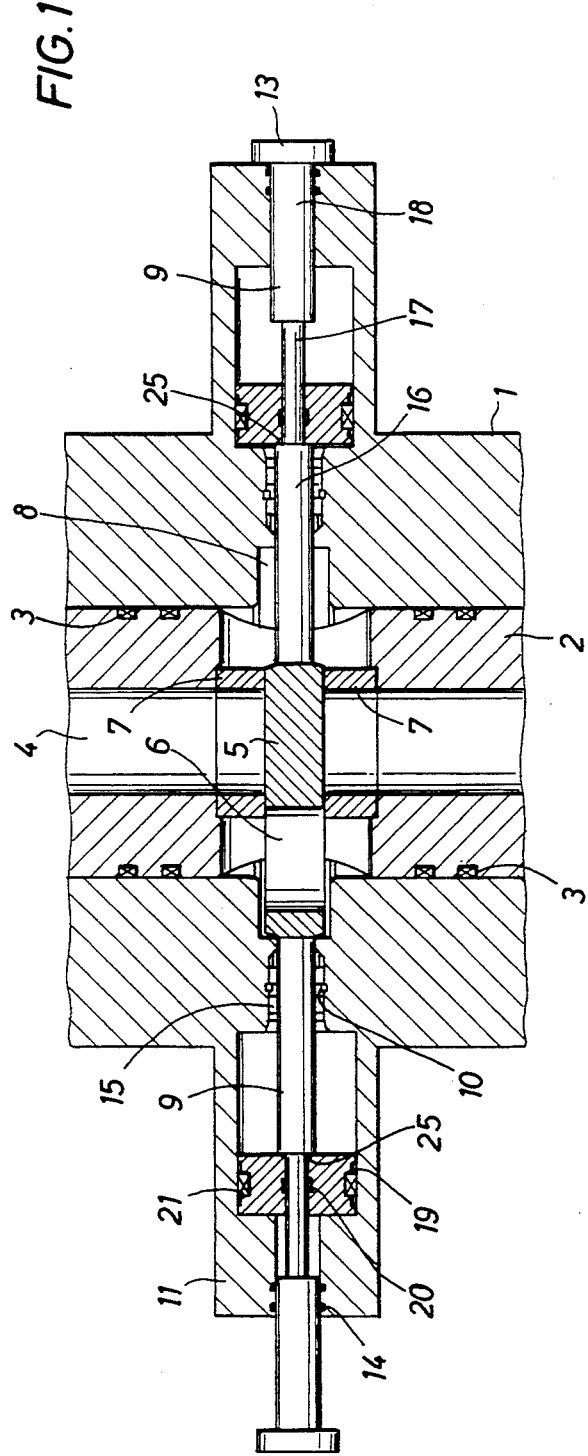
FIGS. 1 and 2 are axial sections of a first example through the gate and wellhead showing the gate valve in closed and open positions respectively.
Figure 2:
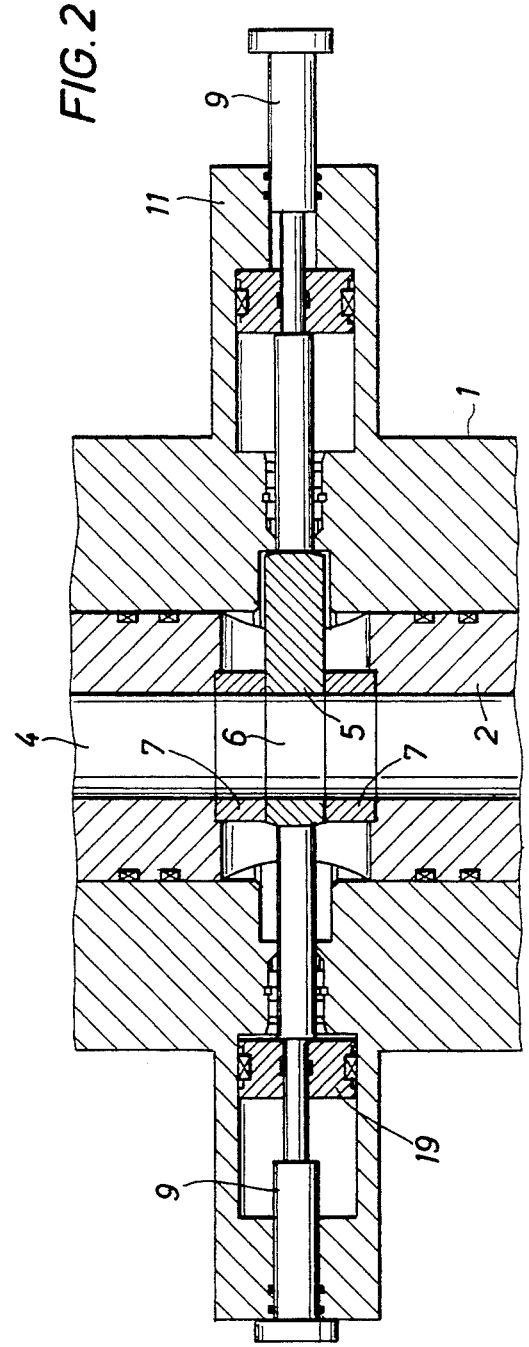
Figure 5:
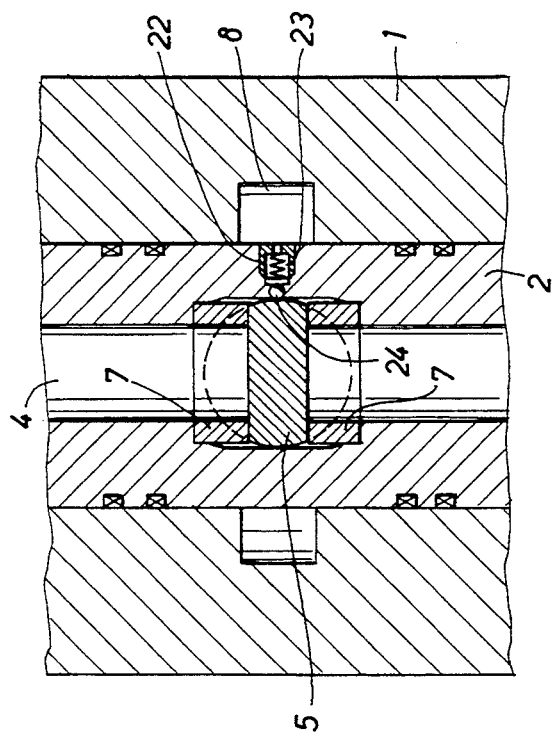
FIG. 5 is an axial section through the gate and wellhead taken at right angles to the views shown in FIGS. 1 to 4.

In order to close the bore 4 of the tubing hanger 2, pressure is applied to the right hand cylinder (as shown in FIG. 1) on the right hand side of the piston 19 through the second pressure supply line 11B. This causes the piston to move to the left and push against a shoulder 25 between the inner part 16 and central part 17 of the stem 9. The first pressure supply line 11A acts as a vent. The gate 5 is therefore urged into the closed position and the left hand stem 9 is urged to the left until the left piston abuts against the end of the chamber of the left cylinder 11 and the respective shoulder 25 abuts against the piston 19. The ends of the stems 9 which project from the cylinders 11 provide a visual indication of the state of the gate. In order to open the bore 4, the pressure is applied to the left hand cylinder 11 and the gate is moved in the opposite direction, but otherwise in a similar manner, to that described above into the position shown in FIG. 2.

When the tubing hanger 2 is to be run into or retrieved from the wellhead, the gate has to be brought into the intermediate position as shown in FIGS. 3 and 4. In this case, pressure is applied to both of the cylinders 11 through the first pressure supply lines 11A in order to force the two pistons 19 into their outermost positions and to force the actuating stems 9 towards the gate. The second pressure supply lines 11B act as vents. As the effective surface area presented by each piston 19 is larger than that presented by the inner part 16 of the actuating stem, the pistons and actuating stems are moved to the positions shown in FIG. 3, with a shoulder 26 between the outer part 18 and the central part 17 of the actuating stem abutting against the piston. This brings the gate 5 into the intermediate position. In this position, there is the possibility that the ends of the actuating stems 9 would interfere with the tubing hanger 2 when it is run into or retrieved from the wellhead. To overcome this problem, when the gate 5 and actuating stems are in the position shown in FIGS. 3, an equal pressure is applied to the chambers on each side of each piston 19 through the first and second pressure supply lines 11A,11B simultaneously. As the outer part 18 of the actuating stem 9 has a larger diameter than the inner part 16, the net effect of the pressure is to cause both actuating stems 9 to be retracted from the gate 5 to the position shown in FIG. 4. The gate is held in this position during running in and retrieval of the tubing hanger by virtue of the plunger 24 which engages with the recess 25 in the gate 5.

An alternative example is shown in FIGS. 9 to 12 in which the hydraulic actuation is replaced by manual operation. The actuating stems are provided by threaded shafts 27, each of which engages a housing 28 fixed to the spool body 1 and terminates at the end remote from the gate with a handwheel 29. The housing 28 which accommodates each actuating stem 27 is provided with an end cap 30. This is adjustable between two positions by virtue of a pair of stubs 31 on the housing 28 each of which is movable along a lazy-Z-shaped slot 32 in the cap 30. When the end cap 30 is in its outer position, the handwheel 29 abuts against it thereby stopping the actuating stem 27 in the intermediate position shown in FIGS. 9 and 10. When the end cap 30 is in its innermost position, the actuating stem can travel further and move the gate between the open and closed positions as shown in FIGS. 11 and 12. To close the gate, the left hand handwheel 29 is moved into its fully unscrewed position and the right hand handwheel 29 is fully screwed in to push the gate 5 into the closed position shown in FIG. 11. This procedure is reversed to open the gate as shown in FIG. 12.

I claim:

1. A valve assembly comprising a tubular member (2) which seats, in use, in a support and has an axial bore (4) which is selectively opened and closed by a gate valve, the valve comprising a gate (5) having an opening (6) therethrough, a first actuating stem (9,27) engageable with one side of the gate and reciprocable, in use, through the support, and a second actuating stem (9,27) engageable with the opposite side of the gate and reciprocable, in use, through the support, wherein the actuating stems can move the gate between open and closed positions, and an intermediate position in which the gate can be run into and withdrawn from the support with the tubular member.

2. A valve assembly according to claim 1, wherein the gate (5) is retainable in the intermediate position so that the tubular member (2) can be withdrawn from the support without the gate interfering with the support.

3. A valve hanger assembly according to claim 2, wherein the gate (5) is retained by means of a detent (22).

4. A valve assembly according to claim 3, wherein the detent comprises a spring loaded plunger (24) in one of the tubular member (2) and gate (5), the end of the plunger being engageable with a recess (24') in the other of the tubular member and gate.

5. A valve assembly according to claim 1, wherein the actuating stems ( 9,27 ) project, in use, from the support to provide a visual indication of the position of the gate (5).

6. A valve assembly according to claim 1, wherein the actuating stems (9,27) are retractable from engagement with the fate (5) when it is in the intermediate position.

7. A valve assembly according to claim 1, wherein each actuating stem (9, 27) has an inner part (16) adjacent to the gate (5), a central part (17) of smaller diameter than the inner part, and an outer part (18), remote from the gate, of larger diameter than the inner part, and a piston (19) being sealed to and slidably fitted on the central part such that it is retained on the central part and abuts, in use, against the inner or outer parts at respective ends (25, 26) of the central part, the piston being sealed to and slidably received in a cylinder, which is fixed, in use, to the support, whereby the application of pressure to the cylinder of one of the actuating stems on the side of the piston remote from the gate causes the gate to be moved to its open position, the application of pressure to the cylinder of the other of the actuating stems on the side of the piston remote from the gate causes the gate to be moved to its closed position, the application of pressure to both cylinders on the side of the piston closest to the gate causes the gate be moved to its intermediate position, and the application of equal pressure to each side of both pistons causes the actuating stems to be retracted from the gate when it is in the intermediate position.

8. A valve assembly according to claim 1, wherein a seal ring (7) is provided on each side of the gate which ring seals on one side against the gate (5) and on the other side around the bore (4) of the tubular member (2).

9. A valve assembly according to claim 8, wherein the seals between the gate and seal rings, and between the tubular member and seal rings are metal-to-metal seals.

* * * * *